(12) United States Patent
Moredock (10) Patent No.: US 6,319,304 B1
(45) Date of Patent: Nov. 20, 2001

(54) POWERED LOW RESTRICTION AIR PRECLEANER DEVICE AND METHOD FOR PROVIDING A CLEAN AIR FLOW TO AN APPARATUS SUCH AS A COMBUSTION ENGINE AIR INTAKE, ENGINE COOLING SYSTEM, VENTILATION SYSTEM AND CAB AIR INTAKE SYSTEM

(75) Inventor: James G. Moredock, Jacksonville, FL (US)

(73) Assignee: Sy-Klone Company, Inc., Jacksonville, FL (US)

(*) Notice: Subject to any disclaimer, the term of this patent is extended or adjusted under 35 U.S.C. 154(b) by 0 days.

(21) Appl. No.: 09/369,846

(22) Filed: Aug. 9, 1999

Related U.S. Application Data
(60) Provisional application No. 60/095,882, filed on Aug. 10, 1998.

(51) Int. Cl.[7] ................................................. B01D 45/12
(52) U.S. Cl. ........................... 95/269; 95/270; 55/385.3; 55/396; 55/401; 55/438; 55/457
(58) Field of Search ........................ 55/385.3, 392, 55/394, 396, 401, 438, 456, 457; 95/269, 270

(56) References Cited

U.S. PATENT DOCUMENTS

| | | | |
|---|---|---|---|
| 1,931,194 | * 10/1933 | Hawley | 55/396 |
| 2,462,797 | * 2/1949 | Whitaker | 55/396 |
| 3,064,411 | 11/1962 | Breslave, Jr. | 55/457 |
| 3,069,071 | 12/1962 | Carlson | 55/438 |
| 3,137,552 | 6/1964 | Weinand . | |
| 3,191,364 | 6/1965 | Sylvan . | |
| 3,217,976 | 11/1965 | Downs | 55/438 |
| 3,276,189 | 10/1966 | Sylvan | 55/438 |
| 3,276,679 | 10/1966 | Booth . | |
| 3,444,672 | 5/1969 | Alsobrooks . | |
| 3,751,907 | 8/1973 | Anderson . | |
| 3,885,934 | * 5/1975 | Eads et al. | 55/392 |
| 4,066,552 | 1/1978 | Caine . | |
| 4,702,071 | 10/1987 | Jenkins et al. . | |
| 4,971,518 | 11/1990 | Florin . | |
| 5,000,769 | 3/1991 | Raguideau et al. . | |
| 5,240,593 | 8/1993 | Moredock . | |
| 5,431,535 | 7/1995 | Klujber . | |
| 5,656,050 | 8/1997 | Moredock . | |
| 5,766,315 | 6/1998 | Morefdock . | |

FOREIGN PATENT DOCUMENTS

615247 * 7/1978 (RU) ...................................... 55/457

* cited by examiner

Primary Examiner—David A. Simmons
Assistant Examiner—Robert A. Hopkins
(74) Attorney, Agent, or Firm—Antonelli, Terry, Stout & Kraus, LLP

(57) ABSTRACT

A powered low restriction air precleaner device and method for centrifugally ejecting heavier-than-air particulate debris from debris laden air for providing for a combustion engine air intake, an engine air cooling system, or a cab air intake system, for example. The device employs a fan located in the device for drawing debris laden air into the air precleaner device. The debris laden air is spun in the air precleaner device to form a rotating flow pattern that stratifies the debris laden air with the most massive particles of debris in the outermost orbits of the rotating flow pattern of debris laden air. Debris from the rotating flow pattern is ejected from the device for cleaning the air, which is flowed to an air outlet of the device for supplying the cleaned air.

33 Claims, 6 Drawing Sheets

POWERED LOW RESTRICTION AIR PRECLEANER DEVICE AND METHOD FOR PROVIDING A CLEAN AIR FLOW TO AN APPARATUS SUCH AS A COMBUSTION ENGINE AIR INTAKE, ENGINE COOLING SYSTEM, VENTILATION SYSTEM AND CAB AIR INTAKE SYSTEM

RELATED APPLICATION

This application claims the benefit of U.S. Provision Application No. 60/095,882, filed Aug. 10, 1998, the disclosure of which is hereby incorporated by reference.

FIELD OF THE INVENTION

The present invention relates to a powered atmospheric ejective air precleaner device and method for separating the heavier-than-air particulate debris out of an air stream drawn into the device and ejecting the debris back into the environment outside of the device. Debris laden air can be drawn through the powered air precleaner device where it is cleaned for use in an apparatus such as an internal combustion engine, a ventilation system, a heat exchanger, an air compressor, or any apparatus needing a supply of clean air but operating in an environment where the air may be laden with debris.

BACKGROUND AND SUMMARY OF THE INVENTION

Air precleaners that separate heavier-than-air particles from the air to be used in combustion engines, ventilation systems, and any apparatus that draws in air laden with heavier-than-air debris are known. All of these known air precleaners are functional, but do not address all the needs of electronically controlled combustion engines, or other apparatus that draw in air laden with heavier-than-air debris for a precleaner which adds no or minimal air intake restriction while providing high particle separating efficiency over the broad airflow range with which they are used. An object of the present invention is to provide an improved air precleaner device and more efficient method for centrifugally ejecting heavier-than-air particulate debris from the air stream delivering clean air with positive pressure or no or minimal airflow restriction to the apparatus the precleaner is installed on, overcoming the aforementioned disadvantages of the known air precleaners. More particularly, an object of the present invention is to provide an improved air precleaner device and method, which meet or exceed the requirements for use of the air precleaner device in connection with an inline airflow provider for any apparatus requiring or benefiting from a clean air flow such as combustion engines, fixed airflow provider for heat exchangers and heating and air conditioning systems, and total airflow applications for ventilation systems. The air precleaner device and method of the invention offer significant improvements in debris removal and provide positive airflow as compared with conventional atmospheric ejective air precleaners. Instead of depending on the available airflow to drive the mechanical separation process, (which adds to the restriction of the system,) the invention delivers efficient atmospheric precleaning while adding no additional restriction to the apparatus on which the precleaner is installed. In fact, the air precleaner device of the invention may "supercharge" an air intake system minimizing or eliminating overall initial restriction. A fan assembly draws debris laden air into the precleaning system. The debris-laden air is then accelerated in a radial pattern where centrifugal forces acting on the debris are enhanced. These centrifugal forces then discharge the heavier-than-air debris out of a strategically placed ejection port back into the atmosphere. The air precleaner device maintains a positive air pressure on the downstream side such as a filter media, heat exchanger core, or ventilation system; therefore, the invention precleaning device does not suffer performance losses associated with cyclic airflow demands like all other atmospheric precleaners do. Instead, the air precleaner device and method of the invention provide full-time efficient precleaning in the 90% plus range of efficiency.

Specifically, a powered low restriction air precleaner device according to the invention comprises a fan located in the device for drawing debris laden air into the device. The fan includes a fan blade and a motor for rotating the fan blade. Means are provided for spinning the debris laden air drawn into the air precleaner device to form a rotating flow pattern that stratifies the debris laden air with the most massive particles of debris in the outermost orbits of the rotating flow pattern of debris laden air. An ejection duct of the device ejects debris from the rotating flow of the debris laden air in the air precleaner device to clean the air. An air outlet of the device flows the cleaned air from the device to an apparatus to be supplied with cleaned air.

The present invention also comprises an apparatus for providing a flow of clean air, the apparatus comprising, in combination, a powered low restriction air precleaner device according to the invention, in combination with an arrangement for applying a suction to the air outlet of the device for assisting drawing the debris laden air into the air precleaner device. The arrangement for applying a suction to the air outlet of the device can be an air intake of a combustion engine or another fan located downstream of the air outlet of the device, such as on the far side of a radiator for cooling a machine, or on the clean side of an air filter of an air intake system of a cab.

A method for centrifugally ejecting heavier-than-air particulate debris from debris laden air according to the invention for providing clean air to an apparatus comprises the steps of drawing debris laden air into an air precleaner device with a fan located in the device, spinning the debris laden air in the air precleaner device to form a rotating flow pattern that stratifies the debris laden air with the most massive particles of debris in the outermost orbits of the rotating flow pattern of debris laden air, ejecting debris in the rotating flow pattern of debris laden air in the air precleaner device from the air precleaner device to clean the air, and flowing cleaned air to an air outlet of the device.

These and other objects, features and advantages of the present invention will become more apparent from the following description when taken in connection with the accompanying drawings, which show, for purposes of illustration only, one preferred embodiment in accordance with the present invention.

DETAILED DESCRIPTION OF DISCLOSED EMBODIMENT

Figure 1A:
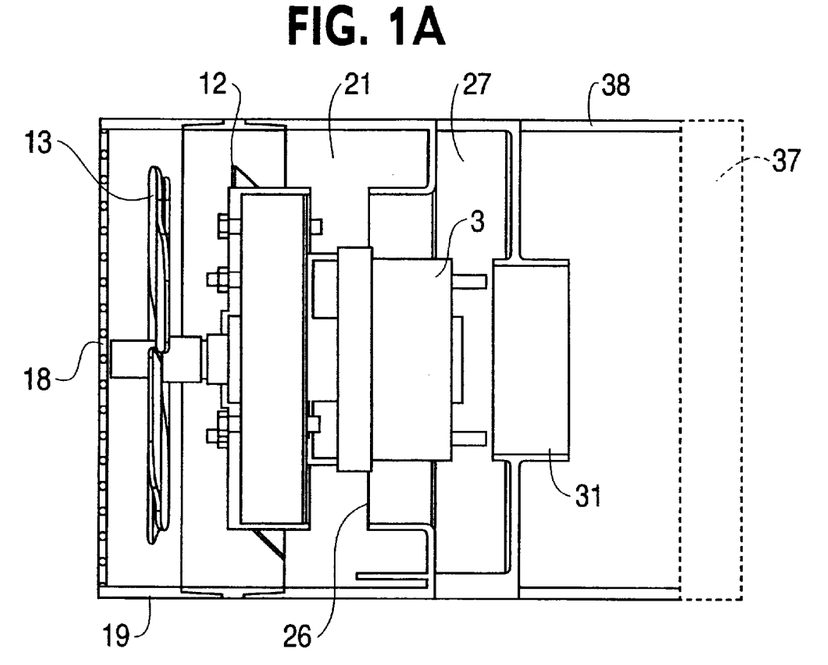
FIG. 1A is a general schematic drawing, taken along the longitudinal central axis of a powered low restriction air precleaner device of the invention in combination with an apparatus for receiving cleaned air from the device.
Figure 1B:
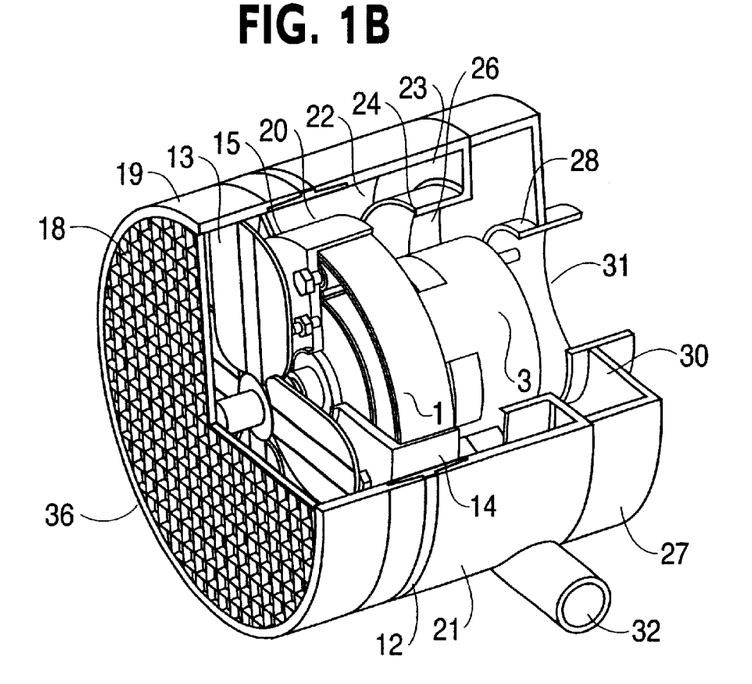
FIG. 1B is a detailed, perspective view from the front and to one side of a preferred embodiment of the powered low restriction air precleaner device of the invention with the upper right quadrant of the device being cut away in part to expose the inside of the device.
Figure 2:
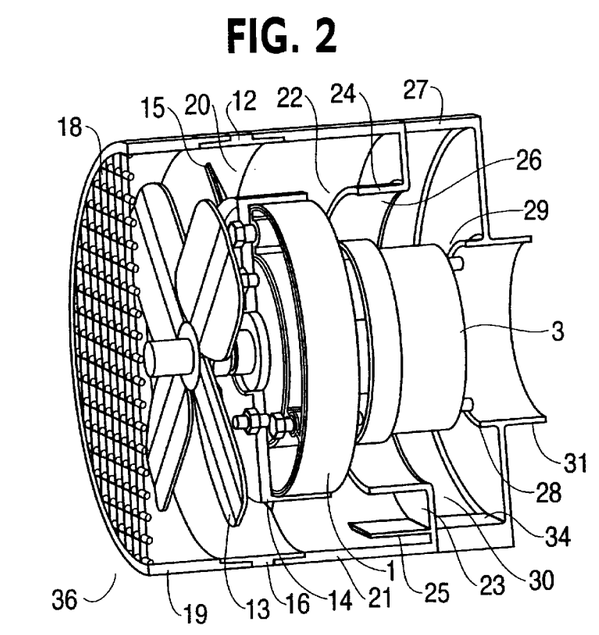
FIG. 2 is a side elevational view of the device of FIG. 1B with an outer part of one-half of the device being cut away to permit viewing the interior of the device.
Figure 3:
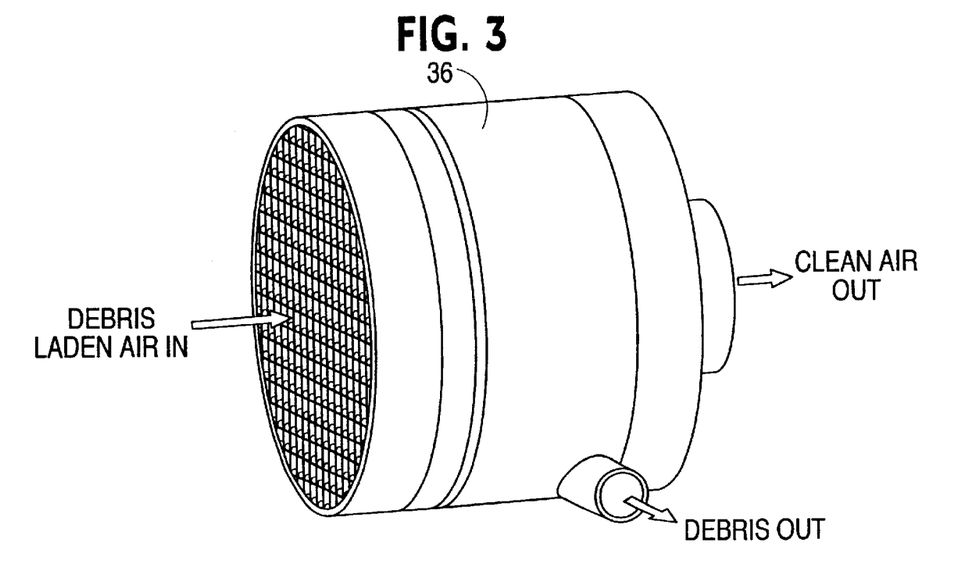
FIG. 3 is a side elevational view of the device like FIG. 2 but without a cut away portion and with arrows depicting the directions of debris laden air in, debris out and clean air out.
Figure 4:
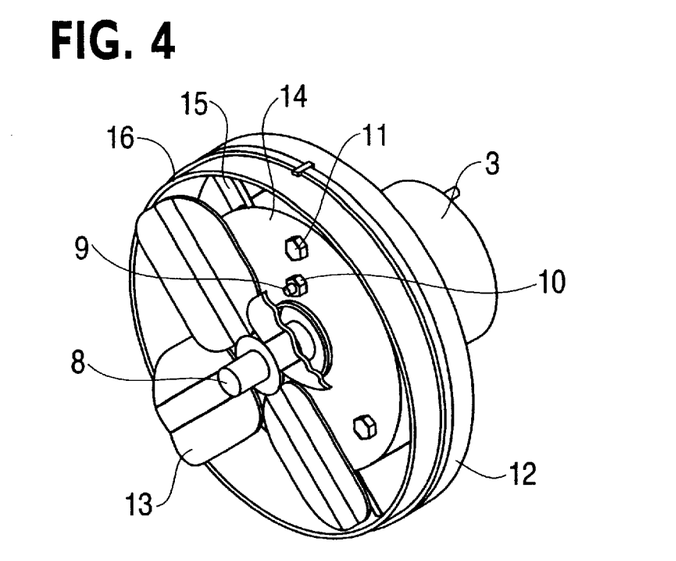
FIG. 4 is a perspective view from the end and to one side of the fan and motor assembly supported in the louvered motor mount of the device of FIGS. 1B–3.
Figure 5:
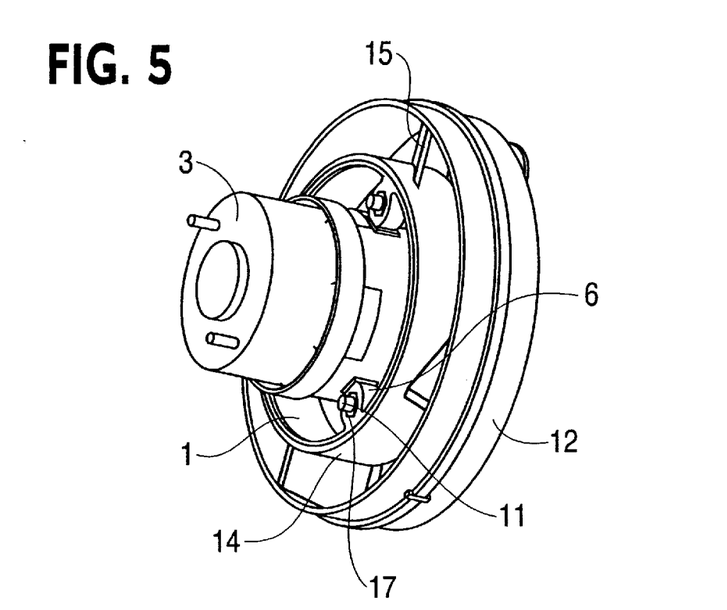
FIG. 5 is a perspective view from the opposite end to that shown in FIG. 4 and to one side of the fan and motor assembly supported in the louvered motor mount of the device of FIGS. 1B–3.

In the drawings, the precleaner device 36 of the invention, shown generally in FIG. 1A and more specifically in the preferred embodiment of FIGS. 1B–11, comprises a prescreen apparatus 18. The prescreen apparatus is formed with holes in a flat plate or screen material to keep out very large airborne debris that would foul the ejection port 32 of the precleaner device. A fan shroud 19 is connected to the prescreen apparatus for directing the incoming, debris laden air into a Primary Positively Pressurized Separation Chamber 21. The fan shroud also starts centrifugal separation by allowing the air to rotate. The centrifugal force caused by the rotation of the incoming air moves the more massive particles outwardly.

A pusher fan comprising a fan blade 13 mounted on a motor shaft 8 of a motor 3 provides the next stage of particle separation by increasing the rotational velocity and centrifugal force of the incoming air particles. This forces the finer debris to stratify outward with the more massive debris. The pusher fan speed is preferably in proportion to the puller fan speed of the associated fan downstream of the precleaner device or designed for the specific air intake air flow so as to maintain a slight positive pressure differential against the radiator core face or air filter media, 37 in FIG. 1.

Figure 6:
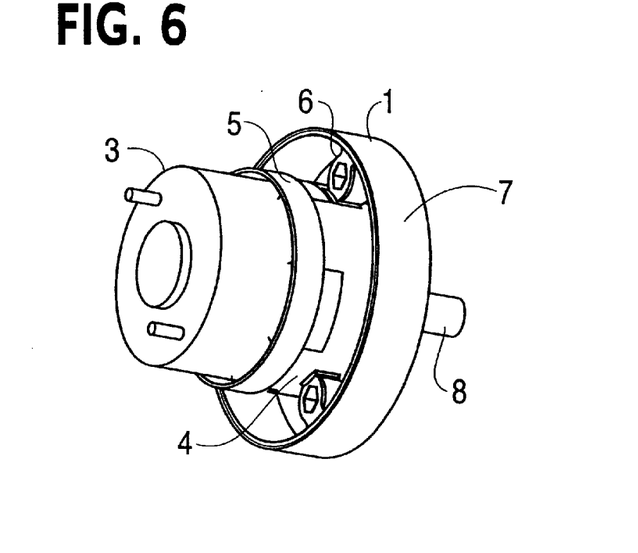
FIG. 6 is a perspective view from one end and to the side of the motor of the air precleaner device with clamp, secondary motor mount and associated mount bosses and depicting inner and outer cylinders of the secondary motor mount.
Figure 7:
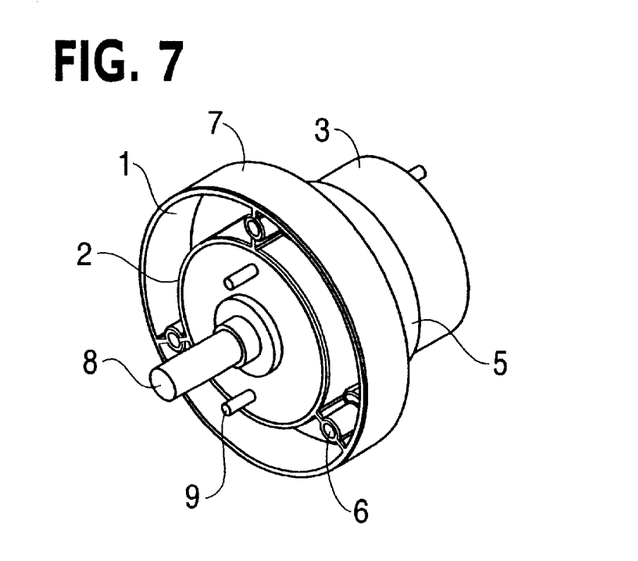
FIG. 7 is a perspective view of the subassembly of FIG. 6 from the opposite end to that shown in FIG. 6 and to one side.
Figure 8:
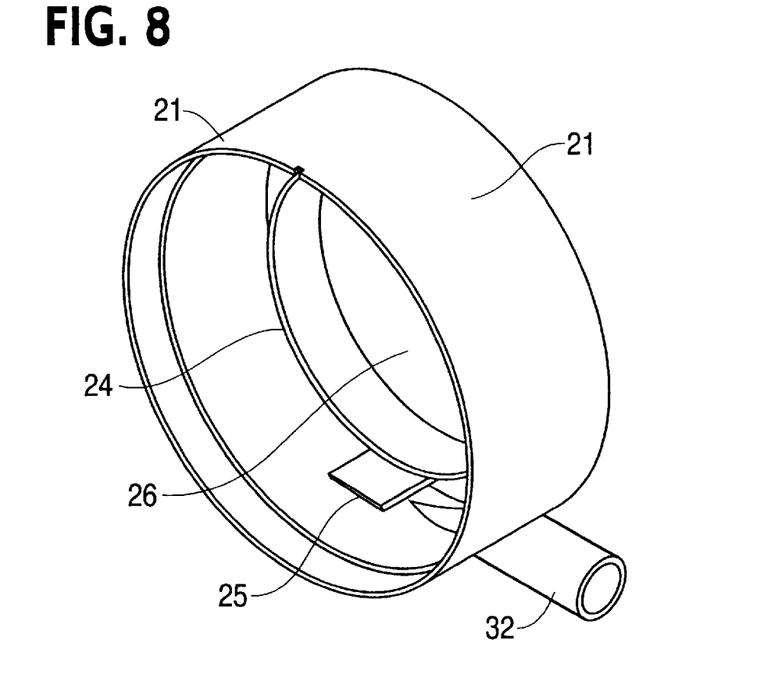
FIG. 8 is a perspective view from one end and to the side of the primary positively pressurized separation chamber of the air precleaner device.
Figure 9:
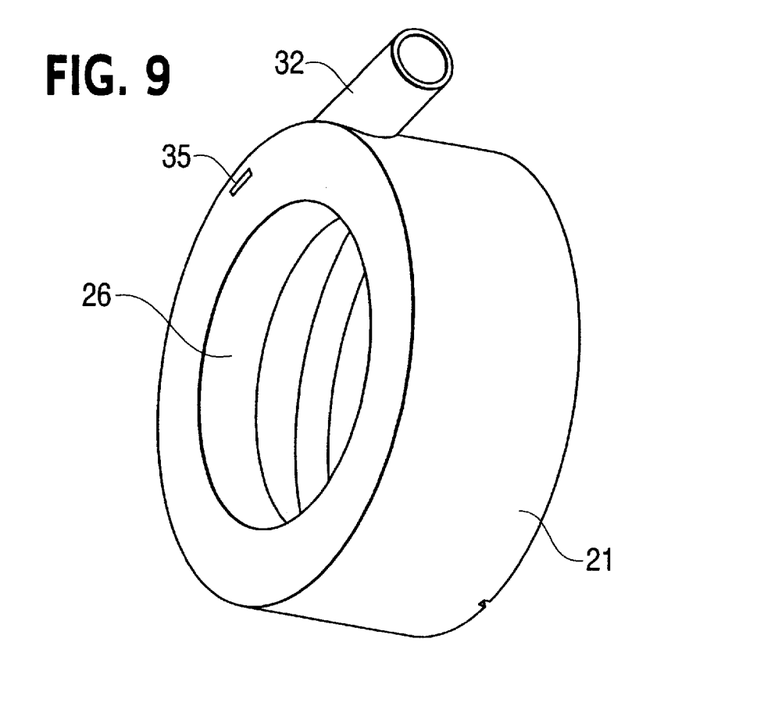
FIG. 9 is a perspective view of the subassembly of FIG. 8 from the opposite end to that shown in FIG. 8 and to one side.
Figure 10:
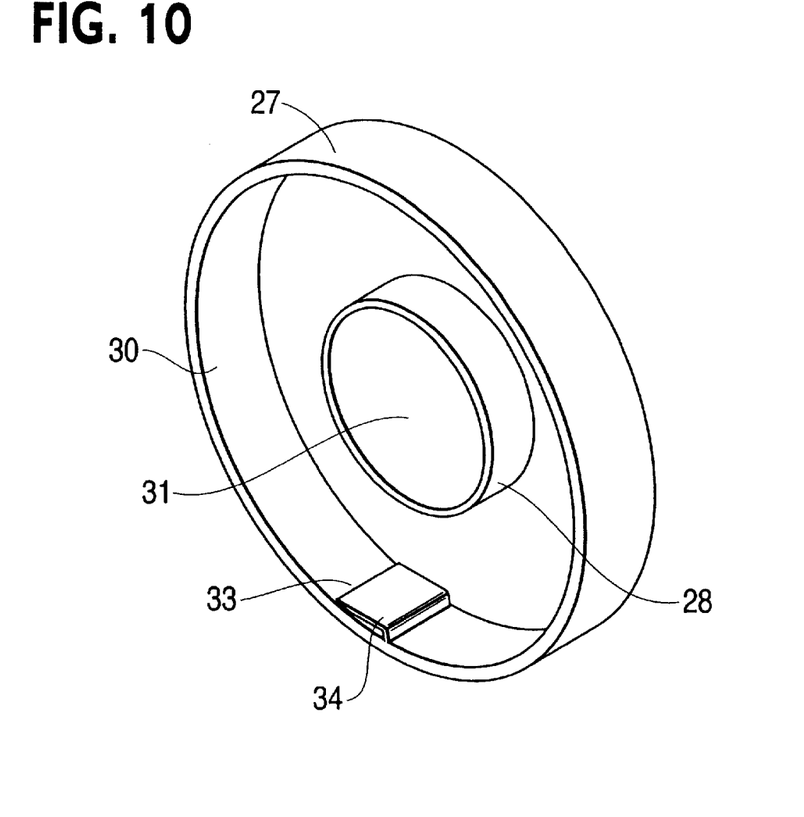
FIG. 10 is a perspective view from one end and to the side of the secondary positively pressurized separation chamber of the air precleaner device of FIGS. 1B–3.
Figure 11:
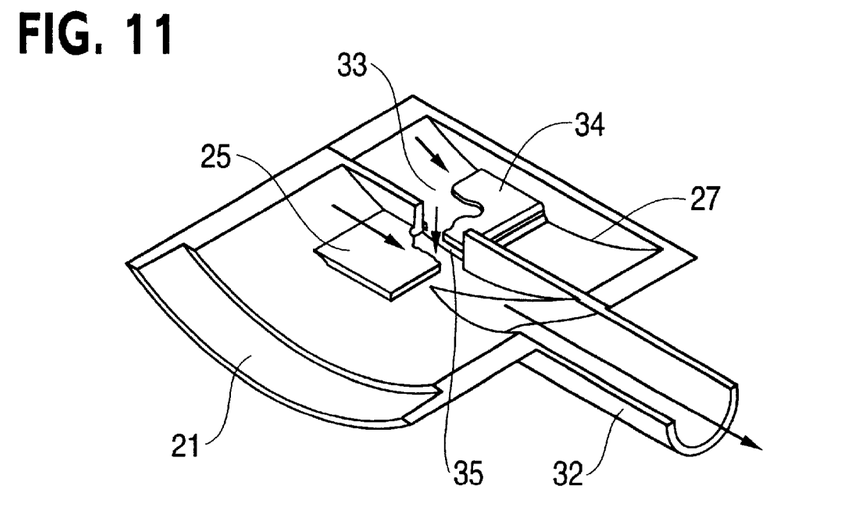
FIG. 11 is an enlarged view of the portion of the bottom of the primary and secondary separation chambers and the ejection duct with venturi for suctioning debris from the chambers and discharging it from the device through the ejection duct to ambient atmosphere.

A louvered motor mount assembly 12 of the device provides particle separation by increasing the air velocity and centrifugal force of the particles passing through the Louvered Motor Mount assembly louvers 15 having reduced cross-sectional area 20 between the mounting cylinder 14 and outer cylinder 16 of the assembly 12 (nozzle effect). The shape of the center of the Louvered Motor Mount assembly diverts the debris laden air around the fan motor 3 (or linkage) and mechanically forces the debris laden air to move in an outward direction. The Louvered Motor Mount assembly may also be used to provide mechanical mounting support for the fan motor 3 (or linkage) by way of louvered motor mount mounting cylinder 14. A secondary motor mount 1 is connected to the mounting cylinder 14 by way of bolts 11 and nylon lock nut 17. Flow holes may be added to the Louvered Motor Mount to allow small portions of air to cool the motor, if needed. As shown in FIGS. 6 and 7, the motor 3 is supported by a clamp 5, secondary motor mount 1 and associated mount bosses 6 connecting inner and outer cylinders 2 and 7 of the secondary motor mount. The inner cylinder 2 has an extension 4 surrounding the motor 3. The motor 3 is also directly supported on the mount assembly 12 by way of motor studs 9 and serrated nuts 10, see FIGS. 1A, 4 and 7.

A primary positively pressurized separation chamber 21 directs the debris-laden air to the secondary positively pressurized separation chamber 27, and channels the debris to the ejection port 32. An ejection port 32 located at the bottom of the Primary Positively Pressurized Separation Chamber assembly allows separated debris to be ejected back to the environment and any moisture to gravity drain.

The Secondary Positively Pressurized Chamber 27 directs the air (most debris was removed in the Primary Positively Pressurized Separation Chamber) through the Secondary Positively Pressurized Separation Chamber exit orifice 31 into the air flow outlet shroud 38 and channels any remaining debris to the Secondary De-acceleration Region debris collection scoop 34, located at the bottom of the Secondary Positively Pressurized Separation Chamber assembly 27, through the venturi port 35 into the Primary Positively Pressurized Separation Chamber assembly 21 where the debris is to be ejected back to the environment and any moisture to gravity drain. The Secondary Positively Pressurized Separation Chamber exit orifice 31 directs the cleaned air out of the secondary ejection chamber and into the airflow outlet shroud. The Secondary Positively Pressurized Separation Chamber exit orifice 31 also regulates the airflow velocity through the primary and secondary positively pressurized Chambers. The airflow outlet shroud 38 directs the cleaned air to the radiator core or air filter media or the combustion engine intake, 37 in FIG. 1. The airflow outlet shroud 38 can also support or hold the air filter media 37 in place.

In operation, debris laden air is drawn into and through the prescreen apparatus 18 by the combined actions of two separate forces: (1) the "pusher" type fan 13, located in the precleaning device and (2) either the engine air intake suction 37 or a "puller" type fan located on the clean side of the machine's engine radiator core or on the clean side of the cab air filter media. As debris laden air passes through the prescreen apparatus 18, the prescreen apparatus 18 screen out the largest debris.

Debris laden air moves through the prescreen apparatus 18 and into the fan shroud 19 where the debris laden air is spun by the pusher fan 13 to form a rotating flow pattern. This pattern is further accelerated as the debris laden air passes through the blades in the Louvered Motor Mount assembly 12 and into the Primary Positively Pressurized Separation Chamber assembly 21, where it becomes fully stratified, with the most massive particles in the outermost orbits.

The debris-laden air enters the Primary Positively Pressurized Separation Chamber 21 and flows into the Primary De-Acceleration Region 22, which mechanically forces the air to de-accelerate. The outward momentum imparted on the more massive air borne debris is now greater than the force acting on the airflow. This causes most of the debris to be trapped in the primary isolation chamber 23 formed by the primary strake appendage 24 out of the main air flow and directed to the ejection port 32 by way of venturi port shield 25, see FIGS. 2 and 11.

The air flow, with the most massive debris removed, moves into the Secondary Positively Pressurized Separation Chamber 27 and through the smaller air flow orifice 26, causing the airflow to accelerate and continue to increase in velocity as it passes into the Secondary Positively Pressurized Separation Chamber 27 assembly at the slightly larger region of the Secondary De-acceleration Region 30 which mechanically forces the air to de-accelerate. The outward momentum of the remaining air borne debris is again greater than the force acting on the airflow. This causes most of the remaining air borne debris to be trapped in the secondary isolation chamber 29 formed by the secondary strake appendage 28 and directed to the Secondary De-acceleration Region inner wall 33 and debris collection scoop 34, see FIGS. 10 and 11, where the debris is channeled through the venturi port 35 into the ejection port 32. The cleaned air flows from the secondary de-acceleration region 30 and exits through the Secondary Positively Pressurized Separation Chamber exit orifice 31 into the airflow outlet shroud 38 and through the radiator core or air filter media or into the intake of the combustion engine 37.

Debris that was removed from the air rotates around the perimeter of the Primary Isolation Chamber 23 until the debris reaches the ejection port 32. The primary and secondary isolation chambers are joined together at the venturi port 35 and debris collected in the secondary isolation chamber 29 passes through the venturi port 35 into the primary isolation chamber 23 and then is ejected through the ejection port 32 located in the primary isolation chamber 23. The ejection port 32 allows debris to be ejected back to the atmosphere by the debris' outward momentum and is assisted by a positive pressure differential maintained in the isolation chambers 23 and 29 by the pusher fan. According to a further feature of the invention, the debris particles orbit the primary and secondary isolation chambers 23 and 29 until they are drawn together at the venturi port 35 developed between the first and second positively pressured isolation chambers 23 and 29 and drawn into a vacuum caused by the pressure difference of the primary positively pressurized separator chamber and the ejection port 32, which vents back to the ambient conditions of the environment. The clean air stream flows from the secondary de-acceleration region 30 through the secondary positively pressurized separator chamber exit orifice 31 to the apparatus 37 requiring the precleaned air.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A powered low restriction air precleaner device for centrifugally ejecting heavier-than-air particulate debris from debris laden air to provide a clean air flow to an apparatus, said air precleaner device comprising:

a fan located in said device for drawing debris laden air into said device, said fan including a fan blade and a motor for rotating said fan blade;

means for spinning the debris laden air drawn into the air precleaner device to form a rotating flow pattern about a longitudinal axis of said air precleaner device that stratifies the debris laden air with the most massive particles of debris in the outermost orbits of the rotating flow pattern of debris laden air;

an ejection port for ejecting debris from the rotating flow of the debris laden air in the air precleaner device to clean the air;

an air outlet for flowing the cleaned air from the device to said apparatus; and primary and secondary separation chambers arranged successively along said longitudinal axis of said device for receiving said rotating flow pattern of debris laden air in said device, said separation chambers each mechanically forcing the air flowing therein to decelerate and then move radially inward with respect to said longitudinal axis before exiting the chambers while trapping debris whose outward momentum is greater than the force trying to move the debris inward, said ejection port being in communication with each of said separation chambers for ejecting trapped debris from said air precleaner device.

2. The method according to claim 1, wherein said ejecting includes drawing debris from the device using a vacuum created by a venturi located in conjunction with an ejection port of said device.

3. The air precleaner device according to claim 1, further comprising a prescreening apparatus through which said debris laden air is drawn into said device to remove from the incoming debris laden air any debris larger than the ejection port.

4. The air precleaner device according to claim 1, including a venturi for creating a vacuum for drawing debris from the rotating flow of the debris laden air in the secondary separation chamber into the primary separation chamber for discharge through said ejection port.

5. The air precleaner device according to claim 1, wherein said means for spinning includes a louvered vane assembly providing a progressively reduced flow cross-sectional area to increase the speed of the rotating flow pattern flowing through the blades of the louvered vane assembly.

6. A powered low restriction air precleaner device for centrifugally ejecting heavier-than-air particulate debris from debris laden air to provide a clean air flow to an apparatus, said air precleaner device comprising:

a fan located in said device for drawing debris laden air into said device, said fan including a fan blade and a motor for rotating said fan blade;

means for spinning the debris laden air drawn into the air precleaner device to form a rotating flow pattern about a longitudinal axis of said air precleaner device that stratifies the debris laden air with the most massive particulates of debris in the outermost orbits of the rotating flow pattern of debris laden air;

ejection means for ejecting debris from the rotating flow of the debris laden air in the air precleaner device to clean the air;

an air outlet for flowing the cleaned air from the device to said apparatus; and primary and secondary separation chambers arranged successively in said device wherein in each of said primary and secondary separation chambers the debris in the outer strata of the rotating flow pattern is trapped and ejected from the device by way of said ejection means while the cleaner inner portion of the rotating flow is forced to exit the separation chamber as it flows toward said air outlet of the device, said primary and secondary separation chambers each having a larger volume than an upstream section of said device and being configured for mechanically forcing the air flowing therein to decelerate and then move radially inward with respect to said longitudinal axis before exiting said chamber while the debris in said rotating flow pattern not being decelerated as efficiently in said separation chambers as the air therein and being separated from the air flowing from said separation chambers toward said air outlet of the device, the separated debris continuing in an orbital flow pattern where it is collected for ejection from said device in an appendage area of said separation chambers isolated from the cleaned air flowing from said separation chambers toward said air outlet of the device.

7. The air precleaner device according to claim 6, wherein said means for spinning is a louvered vane assembly.

8. The air precleaner device according to claim 6, wherein said ejection means includes a single ejection port in communication with each of said primary and secondary separation chambers for ejecting debris from the air precleaner device.

9. An apparatus for providing a flow of clean air, the apparatus comprising, in combination, a powered low restriction air precleaner device for centrifugally ejecting heavier-than-air particulate debris from debris laden air to provide a clean air flow to an air outlet of the device, and an arrangement including means for applying a suction to the air outlet of the device for assisting drawing the debris laden air into the air precleaner device, wherein said air precleaner device comprises:

a fan located in said device for drawing debris laden air into said device, said fan including a fan blade and a motor for rotating said fan blade;

means for spinning the debris laden air drawn into the air precleaner device to form a rotating flow pattern about a longitudinal axis of said air precleaner device that stratifies the debris laden air with the most massive particulate of debris in the outermost orbits of the rotating flow pattern of debris laden air;

means for ejecting debris from the rotating flow of the debris laden air in the air precleaner device back to the ambient conditions of the environment of the air precleaner device to clean the rotating flow of air in the device; and primary and secondary separation chambers arranged along a flow path for the debris laden air drawn into said device wherein in said primary and secondary separation chambers the debris in the outer strata of the rotating flow pattern is trapped and ejected from the device while the cleaner inner portion of the rotating flow is forced to exit the separation chamber as it flows toward said air outlet of the device, said primary and secondary separation chambers each having a larger volume than an upstream section of said device and being configured for mechanically forcing the air flowing therein to decelerate and then move radially inward with respect to said longitudinal axis before exiting said chamber while the debris in said rotating flow pattern not being decelerated as efficiently in said separation chambers as the air therein and being separated from the air flowing from said separation chambers toward said air outlet of the device, the separated debris continuing in an orbital flow pattern where it is collected for ejection from said device in an appendage area of said separation chambers isolated from the cleaned air flowing from said separation chambers toward said air outlet of the device.

10. The apparatus according to claim 9, wherein said secondary separation chamber is located downstream from said primary separation chamber along said flow path.

11. The apparatus according to claim 9, wherein said means for applying a suction to the air outlet of the device is another fan located downstream of the air outlet of the device.

12. The apparatus according to claim 11, wherein said another fan is on the far side of a radiator for cooling a machine.

13. The apparatus according to claim 11, wherein said another fan is on the clean side of an air filter of an air intake system of a passenger cabin.

14. The apparatus according to claim 9, wherein said means for applying a suction to the air outlet of the device is an air intake of a combustion engine.

15. A powered low restriction air precleaner device for centrifugally ejecting heavier-than-air particulate debris from debris laden air to provide a clean air flow from an outlet of the precleaner device to an apparatus, said air precleaner device comprising:

a fan located in said device for drawing debris laden air into said device and rotating the debris laden air to form a rotating flow pattern about a longitudinal axis of said air precleaner device that stratifies the debris laden air with the most massive particulates of debris in the outermost orbits of the rotating flow pattern of debris laden air, said fan including a fan blade and a motor for rotating said fan blade; and primary and secondary separation chambers arranged along a flow path for the debris laden air drawn into said device wherein in each of said primary and secondary separation chambers the debris in the outer strata of the rotating flow pattern is trapped in an appendage area of said separation chamber and ejected from the device while the cleaner inner portion of the rotating flow is forced to exit the separation chamber as it flows toward said air outlet of the device, said primary and secondary separation chambers each being configured for mechanically forcing the air flowing therein to decelerate and then move radially inward with respect to said longitudinal axis before exiting said chamber while the debris in said rotating flow pattern not being decelerated as efficiently in said separation chambers as the air therein and being separated from the air flowing from said separation chambers toward said air outlet of the device, the separated debris continuing in an orbital flow pattern where it is collected for ejection from said device in said appendage areas of said separation chambers isolated from the cleaned air flowing from said separation chambers toward said air outlet of the device.

16. A method for centrifugally ejecting heavier-than-air particulate debris from debris laden air for providing clean air to an apparatus, said method comprising the steps of:

drawing debris laden air into an air precleaner device with a fan located in the device;

spinning the debris laden air in the air precleaner device to form a rotating flow pattern about a longitudinal axis of said air precleaner device that stratifies the debris laden air with the most massive particles of debris in the outermost orbits of the rotating flow pattern of debris laden air;

ejecting debris in the rotating flow pattern of debris laden air in the air precleaner device from the air precleaner device to clean the air; and flowing cleaned air to an air outlet of said device; and said method including flowing the rotating air flow pattern into a separation chamber in said device wherein the debris in the outer strata of the rotating air flow pattern is trapped and ejected from the device while the cleaner inner portion of the rotating flow is mechanically forced to decelerate and move radially inward to exit the separation chamber as it flows toward said air outlet of the device, and reaccelerating the cleaned air flow exiting said separation chamber to induce momentum forces to any remaining debris in said cleaned air flow and performing a further deceleration of said cleaned air flow and separation of remaining debris therefrom before flowing the cleaned air to said air outlet of the device.

17. The method according to claim 16, wherein said separation chamber is a positively pressurized chamber.

18. The method according to claim 17, wherein said ejecting involves venting the air borne debris to the ambient environment from said positively pressurized separation chamber through an ejection port of said device.

19. The method according to claim 16, wherein said separation chamber is a primary separation chamber of said device, the cleaner inner portion of the rotating air flow pattern is forced to exit the primary separation chamber and is passed into a secondary separation chamber of the device for said further deceleration and separation of remaining air borne debris in the outer strata of the rotating air flow pattern, said remaining debris being trapped and ejected from the device while the cleaner inner portion of the rotating air flow pattern is forced to move radially inward to exit the secondary separation chamber as it flows toward said air outlet of the device.

20. The method according to claim 19, including ejecting air borne debris from each of said primary and secondary separation chambers through a common ejection port.

21. The method according to claim 19, including moving trapped debris within the device using a vacuum created by a venturi located at a point joining said primary and secondary separation chambers, in conjunction with an ejection port of said device.

22. The method according to claim 16, including accelerating the rotating flow of debris laden air in the air precleaner device by flowing it through the blades of a louvered motor mount assembly of the air precleaner device providing a progressively reduced flow cross sectional area to increase the speed of the rotating flow pattern.

23. The method according to claim 22, including supporting a motor for rotating said fan in said device by way of said louvered motor mount assembly.

24. The method according to claim 16, wherein the debris in said rotating flow pattern is not decelerated as efficiently in said separation chamber as the air therein and is separated from the cleaner air flowing from said separation chamber toward said air outlet of the device, the separated debris continuing in an orbital flow pattern where it is collected in an isolation area formed by an appendage of said separation chamber isolated from the cleaned air flowing from said separation chamber toward said air outlet of the device.

25. The method according to claim 16, wherein the cleaned air flowing from said separation chamber is drawn to the center of said separation chamber where it exits through an orifice of the chamber.

26. The method according to claim 16, including facilitating said drawing of said debris laden air into said air precleaner device by applying a suction to said air outlet of said device.

27. The method according to claim 26, further comprising applying said suction to said air outlet of said device by an air intake of a combustion engine.

28. The method according to claim 26, further comprising applying said suction to said air outlet of said device by another fan located downstream of said air outlet of said device.

29. The method according to claim 28, wherein said another fan located downstream of said air outlet of said device is on the far side of a radiator for cooling a machine.

30. The method according to claim 28, wherein said another fan located downstream of said air outlet of said device is on the clean side of an air filter of an air intake-system of a passenger cabin.

31. The method according to claim 16, wherein said fan is part of a motor and fan assembly mounted in said air precleaner device.

32. The method according to claim 16, wherein said debris laden air is drawn into said device in an axial flow pattern.

33. The method according to claim 16, wherein said outermost orbits of the rotation flow pattern are against an inner wall of an ejector chamber of said air precleaner device from which debris is ejected from said device.

* * * * *